United States Patent
Iritani

[15] 3,651,763
[45] Mar. 28, 1972

[54] CONVEYING APPARATUS

[72] Inventor: Saihei Iritani, Okazaki, Japan

[73] Assignee: Kabushiki Kaisha Toyoda Jidoshokki Seisakusho, Toyoda-cho, Kariya, Aichi, Japan

[22] Filed: Mar. 19, 1970

[21] Appl. No.: 20,969

[30] Foreign Application Priority Data

Mar. 29, 1969 Japan......................44/24216

[52] U.S. Cl..............................104/25, 198/110
[51] Int. Cl............................................A63g 1/00
[58] Field of Search................104/20, 25; 198/110, 181

[56] References Cited

UNITED STATES PATENTS 3,320,903  5/1967  Knolle ........................104/20

FOREIGN PATENTS OR APPLICATIONS 619,659  4/1927  France........................104/25

Primary Examiner—Richard E. Aegerter
Attorney—Wenderoth, Lind & Ponack

[57] ABSTRACT

A conveying apparatus consisting of a group of transport member or vehicles, said vehicles being horizontally oscillatable relative to each other, and a pair of guide rails arranged in endless form or a closed loop circuit for guiding said vehicles, said vehicles being guided by said guide rails from parallel position into series position, and vice versa.

5 Claims, 6 Drawing Figures

PATENTED MAR 28 1972 3,651,763
SHEET 1 OF 2
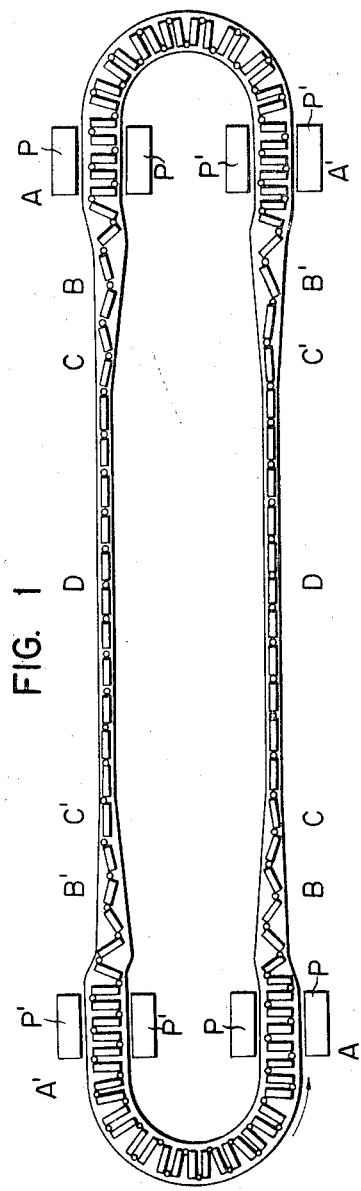
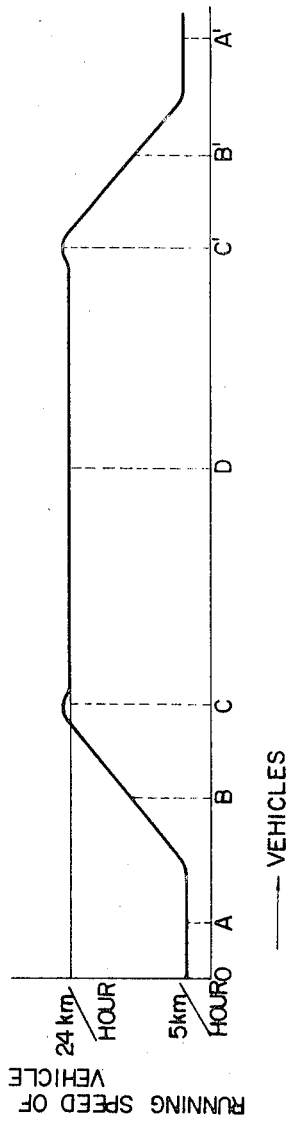
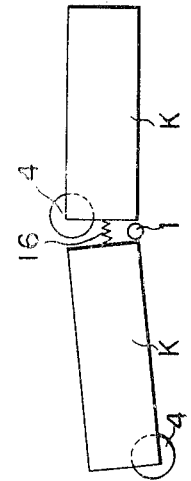
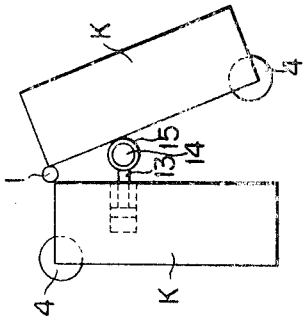
SAIHEI IRITANI,
INVENTOR
BY
ATTORNEYs

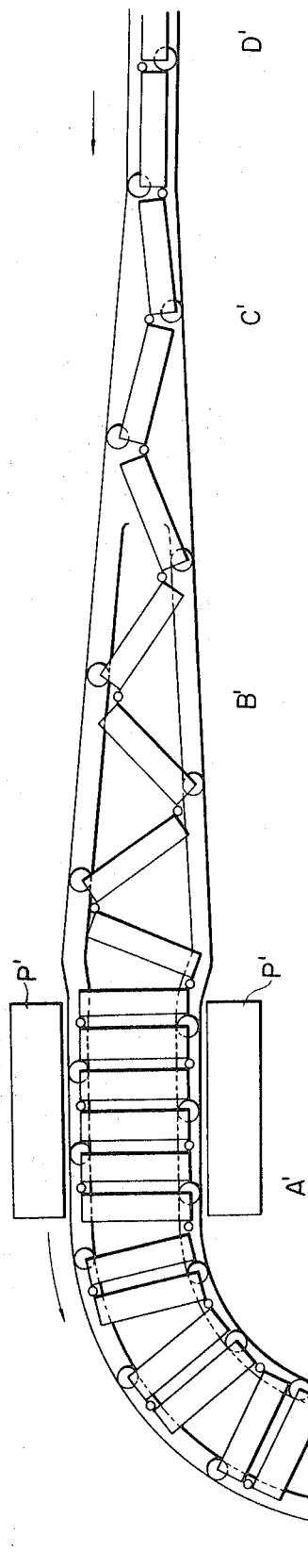
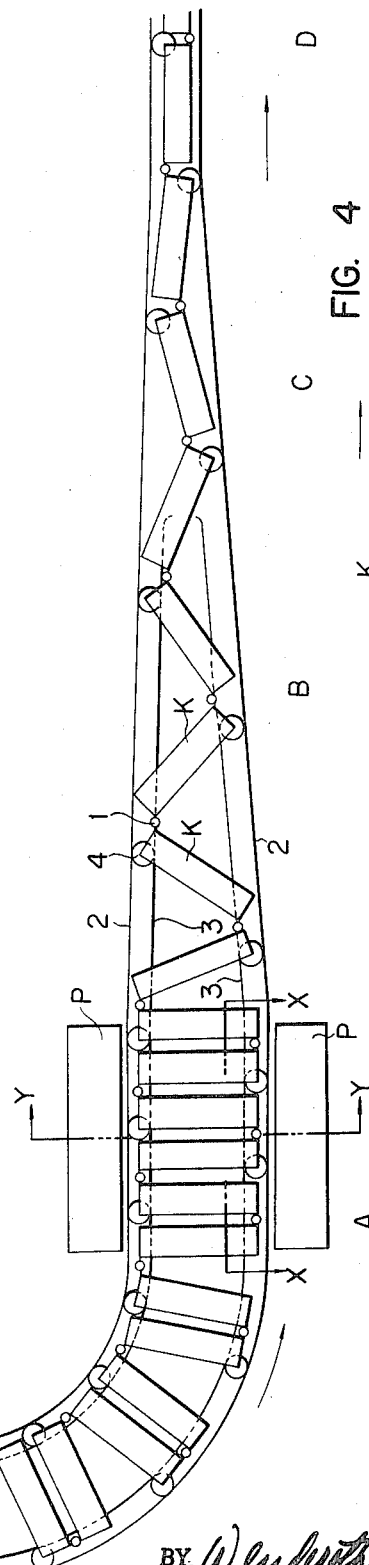
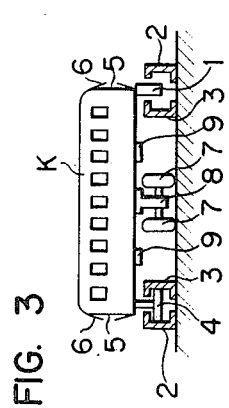
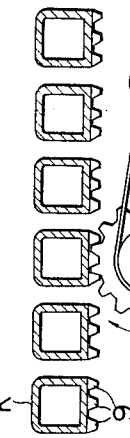
FIG. 2
FIG. 4
FIG. 3
SAIHEI IRITANI,
INVENTOR
ATTORNEYS

CONVEYING APPARATUS

In conveying load materials continuously, heretofore it has been generally practised to employ a belt conveyor system. This system is characterized by the fact that the load materials may be conveyed at constant speed throughout the whole length of transportation, from the start point to the terminal. However, in handling fragile articles, or in the case of the human body, it is not possible to lower the running speed of the conveyor at the start point or at the terminal in order to minimize any shock or to maintain running speed of the conveyor lower than the predetermined speed. Consequently, the conveyor will have to be operated at the predetermined normal speed, which results in the lowest conveying efficiency. In view of the above, it has been proposed to employ a plurality of belt conveyors with different running speeds, and to transport the load materials from one conveyor to another conveyor with higher running speed. In such system, however, acceleration or deceleration is effected step by step, and the load materials are repeatedly subjected to shock. Moreover, the construction of the apparatus will have to be quite complicated.

The principal object of the present invention is to provide a novel conveying apparatus adapted to be accelerated or decelerated continuously and operated at higher conveying efficiency. An embodiment of this invention as applied to a continuous conveying apparatus will be described with reference to the accompanying drawings, in which:

FIG. 1 is a plan view of the conveying apparatus according to the present invention;

FIG. 2 shows a detail of the left half portion of FIG. 1;

FIG. 3 is a side elevation partly in section of one of the transport members or vehicles forming a part of the apparatus of this invention, the section being taken along line Y—Y of FIG. 2 and seen in the direction of arrows;

FIG. 4 is a side elevation, partly in section of an example of a driving part of the conveying apparatus of this invention, the section being taken along line X—X in FIG. 2 and seen in the direction of arrows;

FIG. 5 shows the shock absorber element between two adjacent vehicles; and

FIG. 6 is a graph for explaining the speed of the transport member or vehicle.

Referring now to the accompanying drawings, FIG. 2, showing an embodiment of the invention as applied to an apparatus for continuously conveying persons, K designates a transport means or a vehicle. A plurality of said vehicles K are connected by means of coupling pins 1 so as to be oscillatable horizontally. 2, 2 designate a pair of guide rails for guiding said vehicles K. The wide gauge spacing zone A—A', the intermediate gauge spacing zone B—B' and C—C' and the narrowest gauge spacing zone D are continuously connected as shown. The curvature zone E connecting A zone with A' zone is of substantially same gauge spacing as the zone A—A'. The zone A is provided with a loading platform P, and the zone A' is provided with an unloading platform p'. As shown in FIG. 3, each guide rail 2 is channel shaped and a guide roller 4 is in rolling contact with the channel of the guide rail 2. The guide roller 4 is mounted on a vertical axle and is adapted for rotation in a horizontal plane. 3 is an auxiliary guide rail opposibly arranged relative to the rail 2, and it is adapted for controlling the movement of the guide roller 4. In the interior of the vehicle K, there are provided seats for passengers, and an entrance 5 is provided. The weight of the vehicle K is supported by wheels 7 rolling on a base, such as a road. The wheel 7 and the axle thereof are supported by a horizontally rotating member 8.

The driving system shown in FIG. 4 is adapted for giving motive power to the vehicles K. Assume that the vehicles K are moved in parallel position in the vicinity of zone A and that each vehicle K is provided with rack gears 9 in the bottom, which rack gears 9 are in engagement with the pinion gear 10 of the driving device. Said pinion gear 10 is associated with the motor 12 through an appropriate reduction gear. Of course, any other form of driving means may be employed. For example, each vehicle may be provided with a prime mover such as is usually employed in street cars.

As shown in FIG. 5, a shock absorbing means is provided between two parallel vehicles. Such means comprises a pneumatic cylinder 13. A vertical shaft 14 at the end of said cylinder 13 has a roller 15 which is horizontally rotatable and abuts against the adjacent vehicles. 16 is a shock absorbing spring arranged between the adjacent vehicles. While said parts 13, 14, 15 and 16 are provided for all the vehicles, in FIGS. 2 and 3 such parts are omitted for the sake simplification.

The operation of the present invention will be described as follows. Upon rotation of the pinion gear 10 in the direction of arrow, the vehicles K will be moved in the direction of arrow in FIGS. 1 and 2. It is assumed that the running speed of the vehicles passing through the departure or loading platform P is held at walking speed of person, approximately 80 m./minute (approximately 5 Km./hour). Assuming that the length and width of the vehicle including the coupling pin 1 are 2 m. and 10 m., respectively, the number of vehicles passing through the loading platform will be 80 m./minute = 40/minute. Also at zone D—', where the vehicles pass in series position, the number of vehicles will have to be 40/minute, and the running speed of the vehicle at the zone D—D' will be 10 m. × 40/minute = (24 Km./hour). At the zone A, where the vehicles are running in parallel position, the vehicles passing through the loading platform P run at the speed of approximately 5 Km./hour. They will be accelerated at B zone, and at the zone D, where the vehicles are positioned in series position, the vehicle will be accelerated to a speed of 24 Km./hour. Thereafter, the running speed is decelerated at B' zone, and when the vehicles are in parallel position and pass through the terminal or unloading platform P' as at A' zone, the vehicles return to the initial speed of 5 Km./hour. In the zone C—C', as the vehicles are positioned in series position on a diagonal line, the length of the vehicle will be $\sqrt{10m^2+2m^2}=10.2m$. Thus the running speed of the vehicle passing along the zone C—C' will be 10.2m. × 40/minute. FIG. 6 is the graph showing the above-mentioned change of running speed of the vehicles.

When U-turning the vehicles from A' zone to A zone as shown in FIG. 2, two vehicles are oscillated and turned around the connecting pin on the inner end. The guide rails in the zone D need not always be arranged in a straight line, but may be appropriately curved if so desired. Then the vehicles are changing their course from the zone A toward the zone B, there will be greater resistance due to the greater pressure of the guide wheel 13 against the guide rails 2. In order to relieve such difficulty, air under pressure is preferably introduced into the shock absorbing pneumatic cylinder 13, whereby the vehicles may be smoothly moved along the guide rails 2.

From the foregoing, it will be seen that according to the present invention the desirable stepless acceleration and deceleration of speed is possible, even with the continuous conveying system, not requiring any waiting time, and that the apparatus is adapted for conveying any materials or human bodies at higher conveying efficiency. The vehicles conveyed by the conveying apparatus need not be equipped with any engine, nor motor, nor any source of power, so that there need not be produced any noise, exhaust, nor any accident due to electric shock. As all vehicles are connected in an endless chain, there will not occur any accident due to collosion of vehicles.

The apparatus of this invention is not subjected to concentrated loads, so that strength of the guide rails may be lower than that for the hitherto known transport system. Since, according to this invention, in spite of the fact that acceleration and deceleration of speed may be effected continuously, the present system can be controlled at a central control station, a car service man will not be necessary. Moreover, according to this system, the motive power required for acceleration of speed will be supplied by the vehicle decelerating, and that it will be unnecessary to provide any brake system.

In carrying out the present invention, the continuous conveying system may be utilized for the art of spray coating of any article. In such coating industry, the conveyor system is installed at a high level, and provided with hooks for supporting depending holders for the articles to be coated and dried. In such conveyor system, articles to be coated and dried are suspended at wider intervals and conveyed preferably at lower speed.

What I claim is:

1. In a conveying apparatus having a group of transport members, means for connecting said members relative to each other in an endless end-to-end manner and in a manner allowing said members to be horizontally pivotable relative to each other, and a pair of guide rails arranged in a closed loop circuit for guiding said members, said members being guided by said rails from a position in which they are substantially parallel and side by side, into a position in which they are end-to-end in series, the improvement comprising a shock absorbing means between two adjacent members and comprising a movable member, one end of which is movably carried on one member and the other end being abuttable against the other member to absorb a shock from said other member.

2. A conveying apparatus as claimed in claim 1, wherein said shock absorber means is a telescopically operated fluid pressure cylinder.

3. A conveying apparatus as claimed in claim 1, wherein each of said shock absorbing means is mounted on one of the sides of each said transport member.

4. A conveying apparatus as claimed in claim 1, in which said shock absorber means is a cushioning spring situated to cushion the coming together of adjacent transport members.

5. A conveying apparatus as claimed in claim 4, said spring being mounted on one of the ends of each transport member at a predetermined position spaced horizontally from the position of said connecting means.

* * * * *